United States Patent
Breu et al.

(10) Patent No.: US 12,176,586 B2
(45) Date of Patent: Dec. 24, 2024

(54) POWER SUPPLY DEVICE HAVING A FUEL CELL DEVICE AND A BATTERY, FUEL CELL VEHICLE, AND METHOD FOR STARTING A POWER SUPPLY DEVICE

(71) Applicant: AUDI AG, Ingolstadt (DE)

(72) Inventors: Martin Breu, Rattiszell (DE); Maximilian Schiedermeier, Ingolstadt (DE); Fabian Schulte, Nuremberg (DE)

(73) Assignee: AUDI AG, Ingolstadt (DE)

( * ) Notice: Subject to any disclaimer, the term of this patent is extended or adjusted under 35 U.S.C. 154(b) by 861 days.

(21) Appl. No.: 17/265,184

(22) PCT Filed: Apr. 9, 2019

(86) PCT No.: PCT/EP2019/058858
§ 371 (c)(1),
(2) Date: Feb. 1, 2021

(87) PCT Pub. No.: WO2020/025179
PCT Pub. Date: Feb. 6, 2020

(65) Prior Publication Data
US 2021/0257633 A1   Aug. 19, 2021

(30) Foreign Application Priority Data
Aug. 2, 2018   (DE) .................. 10 2018 212 881.2

(51) Int. Cl.
*H01M 8/04223*   (2016.01)
*H01M 8/04302*   (2016.01)
(Continued)

(52) U.S. Cl.
CPC ... *H01M 8/04253* (2013.01); *H01M 8/04302* (2016.02); *H01M 8/04634* (2013.01);
(Continued)

(58) Field of Classification Search
None
See application file for complete search history.

(56) References Cited

U.S. PATENT DOCUMENTS

| 8,034,498 B2 | 10/2011 | Manabe et al. |
| 8,524,408 B2 | 9/2013 | Lai et al. |

(Continued)

FOREIGN PATENT DOCUMENTS

| DE | 10 2007 046 057 A1 | 4/2008 |
| DE | 11 2006 000 895 T5 | 5/2008 |

(Continued)

OTHER PUBLICATIONS

Machine translation of DE 10 2014 018 197 A1 (Year: 2015).*
Machine translation of JP 2018-074889 A (Year: 2018).*

*Primary Examiner* — Robert S Carrico
(74) *Attorney, Agent, or Firm* — Seed IP Law Group LLP

(57) ABSTRACT

A power supply device for the electrical power supply of at least one consumer has a primary power grid, in which a fuel cell device is present, having a secondary power grid, in which a battery is present, having an operating voltage range bounded at the top by a maximum voltage and at the bottom by a minimum voltage, and having an operating current strength range for powering the at least one consumer. An open circuit voltage of the fuel cell device corresponds at most to the maximum voltage of the battery, while there is present in the primary power grid an impedance spectroscopy device, which is designed to perform an impedance spectroscopy measurement on the fuel cell device or on individual fuel cells of the fuel cell device. A fuel cell vehicle has such a power supply device and a method for starting a power supply device.

6 Claims, 1 Drawing Sheet

(51) Int. Cl.
    *H01M 8/04537*    (2016.01)
    *H01M 16/00*      (2006.01)
(52) U.S. Cl.
    CPC ...... *H01M 16/006* (2013.01); *H01M 2220/20* (2013.01); *H01M 2250/20* (2013.01); *H01M 2250/402* (2013.01)

(56)  References Cited

U.S. PATENT DOCUMENTS

| | | |
|---|---|---|
| 9,664,178 B2 | 5/2017 | Krainer |
| 2004/0157094 A1 | 8/2004 | Reiser et al. |
| 2005/0181246 A1 | 8/2005 | Nakaji |
| 2010/0209791 A1* | 8/2010 | Manabe ............... H01M 8/0441 |
| | | 429/429 |
| 2017/0229729 A1* | 8/2017 | Elliott .................... H01M 8/24 |
| 2018/0108925 A1* | 4/2018 | Won .................... H01M 8/2457 |
| 2018/0212262 A1 | 7/2018 | De Beer |

FOREIGN PATENT DOCUMENTS

| | | |
|---|---|---|
| DE | 10 2014 018 197 A1 | 6/2015 |
| DE | 10 2014 224 290 A1 | 2/2016 |
| DE | 11 2007 003 164 B4 | 5/2016 |
| DE | 10 2016 116 049 A1 | 3/2018 |
| JP | 2008/522350 A | 6/2008 |
| JP | 2008/166018 A | 7/2008 |
| JP | 2018/074889 A | 5/2018 |
| WO | 2016/059393 A1 | 4/2016 |

\* cited by examiner

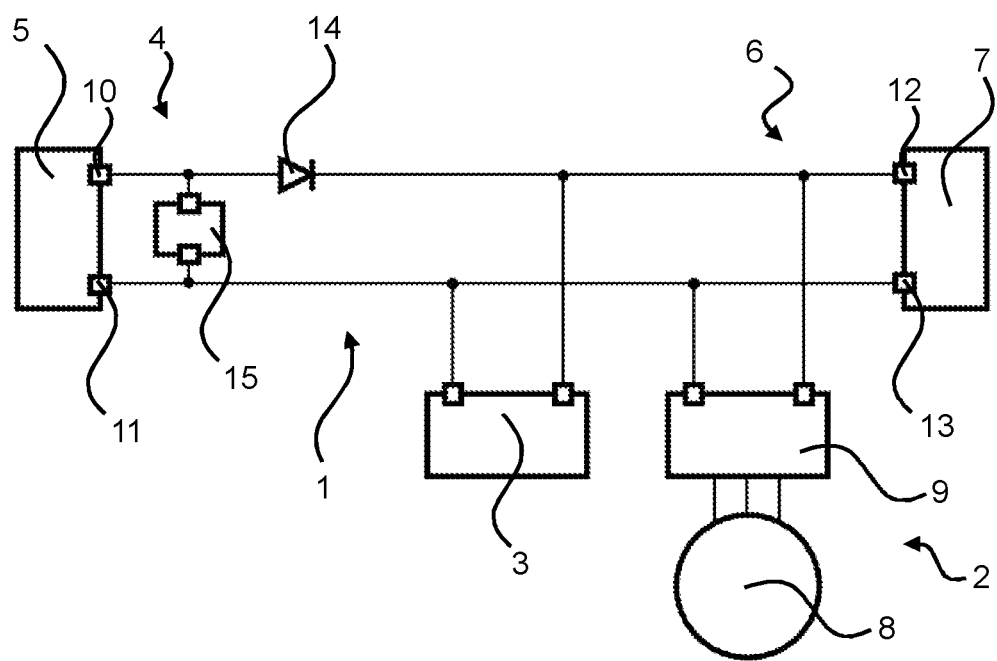

POWER SUPPLY DEVICE HAVING A FUEL CELL DEVICE AND A BATTERY, FUEL CELL VEHICLE, AND METHOD FOR STARTING A POWER SUPPLY DEVICE

BACKGROUND

Technical Field

Embodiments of the invention relate to a power supply device for the electrical power supply of at least one consumer, having a primary power grid, in which a fuel cell device is present. Furthermore, the power supply device comprises a secondary power grid, in which a battery is present, having an operating voltage range bounded at the top by a maximum voltage and at the bottom by a minimum voltage. Moreover, the battery has an operating current strength range for powering the at least one consumer. Furthermore, embodiments of the invention relate to a fuel cell vehicle having such a power supply device and a method for starting such a power supply device.

Description of the Related Art

When the power supply device is used in motor vehicles, it is subject to the most varied weather conditions. Low temperatures below the freezing point of water are known to cause serious problems in the starting of a fuel cell device in a power supply device. For example, when frost conditions are present, the anode spaces and/or the cathode spaces may be blocked by ice, so that the operating media are not available in the desired amount at the anodes and/or cathodes of the fuel cell device. Yet frost at the inlet and outlet of the fuel cell device may also result in malfunctioning of actuating elements such as flaps, valves or the like, or cause blocking of the lines carrying the operating media.

Thus, when the conditions of danger for a frost start are present, for example when the outdoor temperature is below 5 degrees Celsius, the fuel cell device and thus the power supply device housing is operated in a frost start mode, before it can go into a normal operating mode.

Known solutions for the detection of frost start conditions in the case of a power supply device of the above mentioned kind propose a primary power grid, which is constantly connected to the secondary power grid across a DC/DC converter (voltage converter or inverter). The DC/DC converter includes a function for impedance spectroscopy, by which the moisture content within the fuel cell device, and therefore within the fuel cell stack, can be determined. With the impedance measurement, in particular with the impedance spectroscopy, conclusions can be drawn as to the membrane resistance within individual fuel cells, the mass transport of the reactants, the charge transfer resistance, and the capacitance of the double layer.

The use of a voltage converter, however, causes additional weight and design space which must be provided for the power supply device.

Therefore, embodiments described herein include a power supply device for the electrical power supply of at least one consumer which has the simplest possible design and at the same time enables reliable information about the condition of the fuel cell device.

Moreover, embodiments described herein include a fuel cell vehicle having such a power supply device and a method for starting such a power supply device with which the presence of frost start conditions can be detected in simple manner.

BRIEF SUMMARY

In some embodiments, an open circuit voltage of the fuel cell device corresponds at most to the maximum voltage of the battery, while an impedance spectroscopy device is present in the primary power grid, which is designed to perform an impedance spectroscopy measurement on the fuel cell device or on individual fuel cells of the fuel cell device.

The impedance spectroscopy device is thus used to check the fuel cell device and determine whether the conditions for a frost start are present in it or in its constituents. If frost start conditions are found, a heating element may be activated, for example, in order to warm up the fuel cell device, thereby making parts blocked by ice once more accessible. Alternatively, the mass flow of the reactants can also be increased in order to bring about a flushing of the cells or the reactant spaces and loosen any blockages. Moreover, it is possible to operate the fuel cell device with a lower voltage. Thanks to the low voltage of the fuel cell device, more heat per gram of $H_2$ is produced by the individual fuel cells, so that the fuel cell device will warm itself and any ice will be melted.

The impedance spectroscopy device can be configured especially for the requirements of the fuel cell device, without being subject to any restrictions in regard to a DC/DC converter installed in the primary power grid and/or secondary power grid. Furthermore, it offers a more economical realization than the use of a DC/DC converter, so that a compact module of a power supply device can be provided, having a simplified design.

The consumer may be, for example, a drive device having a drive unit. When it is electrically connected to the secondary power grid, it can serve for the driving of a fuel cell vehicle, and accordingly for providing a drive torque designed to propel the fuel cell vehicle. For this, the drive device has at least one drive unit, which is designed as an electrical machine, and which can be supplied with electrical energy via the primary power grid and/or the secondary power grid. Naturally, the drive device may be configured as a hybrid drive mechanism and thus comprise, in addition to the drive unit, at least one further drive unit, of a type different from the drive unit. The further drive unit is present, for example, as an internal combustion engine or the like.

The primary power grid and the secondary power grid may form an onboard network of the fuel cell vehicle or represent at least a portion of such an onboard network. In the primary power grid, there is provided a first power source in the form of the fuel cell device and in the secondary power grid, there is provided a second power source in the form of the battery. The fuel cell device may be present in the form of a single fuel cell or alternatively as a fuel cell stack with multiple fuel cells. The fuel cell device serves for the reliable powering of the onboard network with electrical energy. The battery likewise serves for the reliable powering of the onboard network with electrical energy and is designed for an interim storage of energy, especially energy which has been provided by means of the fuel cell device.

The consumer, and hence the electrical machine, is electrically connected to the secondary power grid and may be electrically connected permanently to the battery during a drive operation of the fuel cell vehicle. The connection of the consumer in the form of a drive unit to the secondary power grid can be realized, for example, across an inverter, especially a pulse inverter.

It may be advantageous when the impedance spectroscopy device is designed to impose an alternating current of different frequencies on power consumers of the fuel cell device. With the aid of this alternating current, it is possible to determine the impedance, i.e., the alternating voltage resistance. When this differs from a normal value, it provides feedback information that the conditions for a frost start are present.

Up to now, it was possible to use a DC/DC converter to impose such alternating currents on the power consumers of the fuel cell device in order to determine the impedance of the fuel cell device. But since the voltage converter is absent, the impedance spectroscopy device is used in order to measure or determine the impedance of the fuel cell device, so that this function is preserved in a configuration of the power supply device free of converters.

It is possible to configure the impedance spectroscopy device so that it measures the current and/or the voltage of the fuel cell device by itself and may plot its variation over time. Hence, the impedance spectroscopy device constitutes a measurement system providing reliable information about the operating condition of the fuel cell device. Aging effects at the fuel cell device can also be detected when a measurement is plotted over time.

The primary power grid may have a first primary power grid connection and a second primary power grid connection, the impedance spectroscopy device being connected at one end to the first primary power grid connection and at the other end to the second primary power grid connection. Furthermore, the secondary power grid has a first secondary power grid connection and a second secondary power grid connection, and the first primary power grid connection and the first secondary power grid connection are connected to each other across a blocking diode and the second primary power grid connection and the second secondary power grid connection are directly connected to each other. Hence, the same electrical potential is present on the second primary power grid connection and the second secondary power grid connection. On the other hand, the first primary power grid connection and the first secondary power grid connection are only connected to each other indirectly across the blocking diode. The fuel cell device and the battery are attuned to each other and enable an extremely efficient operation of the power supply device, which is furthermore distinguished by a very simple and economical design, since no voltage converter is present. In this regard, it may be advantageous when the primary power grid is connected to the secondary power grid free of voltage converters.

The blocking diode may have its conducting direction from the primary power grid toward the secondary power grid. Accordingly, at sufficiently high voltage in the primary power grid, electrical energy can go from the primary power grid to the secondary power grid. The opposite direction of transfer is accordingly excluded, so that no current flows from the battery to the fuel cell device. The imposing of an inadmissibly high voltage on the primary power grid is prevented.

One further development proposes that the battery comprises a certain number of battery cells and/or the fuel cell device comprises a certain number of fuel cells, the number of the battery cells and/or the number of the fuel cells being chosen such that the open circuit voltage of the fuel cell device corresponds to the maximum voltage of the battery. In some embodiments, however, the open circuit voltage of the fuel cell device corresponds substantially to at least 85% of the maximum voltage, such as to 90% of the maximum voltage or to 95% of the maximum voltage of the battery. Thanks to such a configuration, an attuning of the voltage/current characteristics of the fuel cell device and the battery can be done, namely, in terms of the number of battery cells and/or the number of fuel cells of the fuel cell device. Alternatively or additionally, different types of battery cells, such as ones with different rated voltages, can be used to attune the characteristic curve of the battery to that of the fuel cell device.

Furthermore, by the appropriate choice of the operating current strength range and/or by the choice of the number and configuration of battery cells and/or the number and configuration of the fuel cells or the type of the battery cells, it is ensured that the fuel cell voltage provided by the fuel cell device is larger throughout the range of operating current strength than the minimum voltage of the battery. In this respect, the attuning of the fuel cell device and the battery to each other is only done by easily adopted techniques in the design of the fuel cell device and the battery.

Furthermore, it may be advantageous for the impedance spectroscopy device to be formed as a clocked power semiconductor switch. In this way, an alternating current can be imposed on the fuel cell device, such as one of different frequencies. One especially reliable and long-lasting power semiconductor switch with short switching times is a MOSFET (metal oxide semiconductor field effect transistor).

The use of the electrical power supply device in this fuel cell vehicle results in a lower overall weight, thereby saving on design space and costs.

A method may comprise:
a. imposing an alternating current on power consumers of a fuel cell device (5) by means of an impedance spectroscopy device (15),
b. detecting a response signal and comparing the response signal with a given signal value, and
c1. if a difference is determined between the response signal and the given signal value in the amount of at least a predefined amount, starting of the power supply device in a frost start operation, or
c2. if a difference is determined between the response signal and the given signal value in the amount of less than the predefined amount, starting of the power supply device in a normal operation.

Thus, the finding of a condition for a frost start is realized by means of an impedance measurement, especially an electrochemical impedance spectroscopy, on the fuel cell device. An especially compact design of a power supply device is used for this. The signals may be, for example, a voltage signal or also a current signal. The possibility also exists of directly determining the impedance, that is the alternating voltage resistance of the fuel cell device or its individual fuel cells.

BRIEF DESCRIPTION OF THE SEVERAL VIEWS OF THE DRAWINGS

Further benefits, features and details will emerge from the claims, the following description, and the drawings.

FIG. 1 is a schematic representation of a power supply device for the electrical power supply of at least one consumer in the form of a drive mechanism having a drive unit for the driving of a fuel cell vehicle.

DETAILED DESCRIPTION

FIG. 1 shows a schematic representation of a power supply device 1 for the electrical power supply of a first consumer 2 and a second consumer 3. The present power supply device 1 may also provide electrical energy to other consumers, not shown.

The power supply device 1 comprises a primary power grid 4, in which a fuel cell device 5 is present. Furthermore, the power supply device 1 comprises a secondary power grid 6, in which a battery 7 is present, having an operating voltage range which is bounded at the top by a maximum voltage and bounded at the bottom by a minimum voltage. Moreover, the battery 7 has an operating current strength range which is bounded at the bottom by a minimum current strength and bounded at the top by a maximum current strength. The battery 7 is designed to energize the consumers 2, 3.

The consumer 2 comprises a drive unit 8, which is in the form of an electrical machine. This electrical machine can typically operate by means of a three-phase alternating current and may be formed as the traction engine for a fuel cell vehicle. Since the primary power grid 4 and also the secondary power grid 6 supply a high voltage and a direct current, the consumer 2 is additionally associated with the inverter 9, which converts the direct current into the three-phase alternating current. In one modification of the consumer 2, the drive unit 8 may also be used as a generator, so that, for example during the braking process, the energy generated by the drive unit 8 can be fed back to the battery 7 via the inverter 9.

The consumer 3 may likewise be connected to the onboard network formed from the primary power grid 4 and secondary power grid 6. Ancillary units of the fuel cell device 5 may be the consumer 3, such as a charger, a 12V DC/DC converter, a high-voltage heater, an electrical air conditioning compressor, or the like.

As can be seen from FIG. 1, the primary power grid 4 is connected to the secondary power grid 6 free of converters or voltage converters. The fuel cell device 5 comprises a first primary power grid connection 10 and a second primary power grid connection 11. The battery 7 in the secondary power grid 6 accordingly comprises a first secondary power grid connection 12 and a second secondary power grid connection 13. The first primary power grid connection 10 is connected to the first secondary power grid connection 12 across a blocking diode 14. A conducting direction of the blocking diode 14 runs in the direction from the primary power grid 4 to the secondary power grid 6. The second primary power grid connection 11, on the other hand, is electrically connected directly to the second secondary power grid connection 13.

Moreover, in the primary power grid 4 there is an impedance spectroscopy device 15, which is designed to perform an impedance spectroscopy measurement on the fuel cell device 5. In the present instance, the impedance spectroscopy device 15 is switched in parallel with the fuel cell device 5 and is designed to impose an alternating current of different frequencies on current consumers of the fuel cell device 5. Alternatively or additionally, the impedance spectroscopy device 15 is also designed to measure the current and/or the voltage of the fuel cell device 5 and may plot its variation over time. The impedance spectroscopy device 15 may be electrically connected at one end to the first primary power grid connection 10 and at the other end to the second primary power grid connection 11. Both connections here are direct, so that in particular the blocking diode 14 has no influence on the impedance spectroscopy device 15. The impedance spectroscopy device 15 may be formed as a clocked power semiconductor switch, especially a MOSFET.

For the detection of frost start conditions, the MOSFET is operated in clocked mode such that the impedance spectroscopy device 15 so formed imposes an alternating current on the current consumers of the fuel cell device. A response signal is then detected and compared to a given signal value. If the response signal differs from the given signal value, this may be an indication of a frost situation being present. However, minor deviations can be acceptable, so that a deviation range is dictated. Thus, deviations by a given amount still result in a starting of the power supply device 1 in a normal operation. But if a deviation is found which lies outside the given deviation range and which is thus larger than the predefined deviation amount, the power supply device 1 will be started or operated in a frost start operation.

With such a configuration, a very efficient operation of the power supply device 1 can be assured. Hence, the same is true of a drive mechanism which is powered with electrical energy from such a power supply device 1. Furthermore, the power supply device 1 can also be designed very simple, so that design space and cost benefits result when it is used in a fuel cell vehicle.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A power supply device that supplies electrical power to at least one power consumer, the power supply device comprising:
   a primary power grid including a fuel cell device, the primary power grid having a first primary power grid connection and a second primary power grid connection; and
   a secondary power grid including a battery, the secondary power grid having a first secondary power grid connection and a second secondary power grid connection, the battery having an operating voltage range bounded by a maximum voltage and a minimum voltage, and the battery having an operating current strength range for powering the at least one power consumer,
   wherein the first primary power grid connection and the first secondary power grid connection are connected to each other across a blocking diode and the second primary power grid connection and the second secondary power grid connection are directly connected to each other so that the primary power grid is connected to the secondary power grid free of voltage converters and an open circuit voltage of the fuel cell device corresponds at most to the maximum voltage of the battery,
   wherein the primary power grid includes an impedance spectroscopy device which, in operation, checks for a presence of frost conditions on the fuel cell device or on individual fuel cells of the fuel cell device,
   wherein the impedance spectroscopy device is connected at a first end to the first primary power grid connection and at a second end to the second primary power grid connection,
   wherein the impedance spectroscopy device includes a power semiconductor switch that is a Metal Oxide Semiconductor Field Effect Transistor (MOSFET) operated in a clocked mode,
   wherein the impedance spectroscopy device, in operation, compares a given signal value with a response signal generated by the fuel cell device in response to imposition of an alternating current on the at least one power consumer of the fuel cell device, wherein a deviation of the response signal from the given signal value indicates a presence of frost, and wherein the impedance spectroscopy device, in operation, detects the presence of frost if the deviation of the response signal from the given signal value is outside of a given deviation range.

2. The power supply device according to claim 1, wherein the impedance spectroscopy device, in operation, imposes the alternating current of different frequencies on the at least one power consumer of the fuel cell device.

3. The power supply device according to claim 1, wherein the impedance spectroscopy device, in operation, measures a current or a voltage of the fuel cell device.

4. The power supply device according to claim 1, wherein the battery includes a number of battery cells or the fuel cell device includes a number of fuel cells, the number of the battery cells or the number of the fuel cells being chosen such that the open circuit voltage of the fuel cell device corresponds to the maximum voltage of the battery.

5. A fuel cell vehicle having a power supply device that supplies electrical power to at least one power consumer of, the power supply device comprising:

a primary power grid including a fuel cell device, the primary power grid having a first primary power grid connection and a second primary power grid connection; and a secondary power grid including a battery, the secondary power grid having a first secondary power grid connection and a second secondary power grid connection, the battery having an operating voltage range bounded by a maximum voltage and by a minimum voltage, and the battery having an operating current strength range for powering the at least one power consumer, wherein the first primary power grid connection and the first secondary power grid connection are connected to each other across a blocking diode and the second primary power grid connection and the second secondary power grid connection are directly connected to each other so that the primary power grid is connected to the secondary power grid free of voltage converters and an open circuit voltage of the fuel cell device corresponds at most to the maximum voltage of the battery, wherein the primary power grid includes an impedance spectroscopy device which, in operation, checks for a presence of frost conditions on the fuel cell device or on individual fuel cells of the fuel cell device, wherein the impedance spectroscopy device is connected at a first end to the first primary power grid connection and at a second end to the second primary power grid connection, wherein the impedance spectroscopy device includes a power semiconductor switch that is a Metal Oxide Semiconductor Field Effect Transistor (MOSFET) operated in a clocked mode, wherein the impedance spectroscopy device, in operation, compares a given signal value with a response signal generated by the fuel cell device in response to imposition of an alternating current on the at least one power consumer of the fuel cell device, wherein a deviation of the response signal from the given signal value indicates a presence of frost, and wherein the impedance spectroscopy device, in operation, detects the presence of frost if the deviation of the response signal from the given signal value is outside of a given deviation range.

6. A method for starting a power supply device that supplies electrical power supply to at least one power consumer, the power supply device including:

a primary power grid including a fuel cell device, the primary power grid having a first primary power grid connection and a second primary power grid connection; and a secondary power grid including a battery, the secondary power grid having a first secondary power grid connection and a second secondary power grid connection, the battery having an operating voltage range bounded by a maximum voltage and by a minimum voltage, and the battery having an operating current strength range for powering the at least one power consumer, wherein the first primary power grid connection and the first secondary power grid connection are connected to each other across a blocking diode and the second primary power grid connection and the second secondary power grid connection are directly connected to each other so that the primary power grid is connected to the secondary power grid free of voltage converters and an open circuit voltage of the fuel cell device corresponds at most to the maximum voltage of the battery, wherein the primary power grid includes an impedance spectroscopy device which, in operation, checks for a presence of frost conditions on the fuel cell device or on individual fuel cells of the fuel cell device, wherein the impedance spectroscopy device is connected at a first end to the first primary power grid connection and a second end to the second primary power grid connection, wherein the impedance spectroscopy device includes a power semiconductor switch that is a Metal Oxide Semiconductor Field Effect Transistor (MOSFET) operated in a clocked mode, wherein the impedance spectroscopy device compares a given signal value with a response signal generated by the fuel cell device in response to imposition of an alternating current on the at least one power consumer of the fuel cell device, wherein a deviation of the response signal from the given signal value indicates a presence of frost, and wherein the impedance spectroscopy device detects the presence of frost if the deviation of the response signal from the given signal value is outside of a given deviation range;

the method comprising:

imposing an alternating current on the at least one power consumer of a fuel cell device by the impedance spectroscopy device;

detecting the response signal and comparing the response signal with the given signal value;

in response to determining that a difference between the response signal and the given signal value is outside of the given deviation range, starting the power supply device in a frost start operation, in which the fuel cell device is warmed up or in which a mass flow of reactants is increased; and in response to determining that the difference between the response signal and the given signal value is not outside of the given deviation range, starting the power supply device in a normal operation different from the frost start operation.

* * * * *